US012469413B2

(12) United States Patent
Bevans et al.

(10) Patent No.: US 12,469,413 B2
(45) **Date of Patent: *Nov. 11, 2025**

(54) FRAMING SYSTEM FOR USE WITH SILICONE EDGE GRAPHICS

(71) Applicant: DESIGN TO PRINT, INC., St. George, UT (US)

(72) Inventors: Josh Bevans, St. George, UT (US); Howard Stoddard, St. George, UT (US); Jacob Romney, St. George, UT (US)

(73) Assignee: Design To Print, Inc., St. George, UT (US)

(*) Notice: Subject to any disclaimer, the term of this patent is extended or adjusted under 35 U.S.C. 154(b) by 80 days.

This patent is subject to a terminal disclaimer.

(21) Appl. No.: 18/482,770

(22) Filed: Oct. 6, 2023

(65) Prior Publication Data

US 2024/0038100 A1 Feb. 1, 2024

Related U.S. Application Data

(63) Continuation of application No. 17/171,911, filed on Feb. 9, 2021, now Pat. No. 11,790,810.

(60) Provisional application No. 62/972,356, filed on Feb. 10, 2020.

(51) Int. Cl.
*G09F 7/18* (2006.01)
*G09F 13/18* (2006.01)

(52) U.S. Cl.
CPC ................ *G09F 7/18* (2013.01); *G09F 13/18* (2013.01); *G09F 2007/1843* (2013.01); *G09F 2013/1881* (2013.01)

(58) Field of Classification Search
CPC ..... G09F 2013/1881; G09F 2007/1843; G09F 13/18; G09F 7/18
See application file for complete search history.

(56) References Cited

U.S. PATENT DOCUMENTS

| | | | | | |
|---|---|---|---|---|---|
| 3,852,901 | A * | 12/1974 | Woodle | G09F 15/0068 | 40/605 |
| 4,926,605 | A * | 5/1990 | Milliken | E04H 15/646 | 52/63 |
| 5,572,821 | A * | 11/1996 | Coleman | G09F 15/0025 | 160/378 |
| 5,636,936 | A * | 6/1997 | Kremser | E04D 13/032 | 403/387 |
| 6,082,837 | A * | 7/2000 | Battochio | G09F 15/0068 | 411/219 |
| 8,015,736 | B2 * | 9/2011 | Frey | G09F 7/00 | 40/611.01 |
| 2010/0077686 | A1 | 4/2010 | Bowen | | |
| 2013/0036640 | A1 | 2/2013 | Miller | | |
| 2014/0345174 | A1 | 11/2014 | Weight | | |
| 2017/0186346 | A1 | 6/2017 | McNeal | | |
| 2018/0075787 | A1 | 3/2018 | Frey | | |
| 2018/0180077 | A1 * | 6/2018 | White | A47G 1/065 | |
| 2020/0005685 | A1 | 1/2020 | Anderson | | |
| 2020/0066192 | A1 * | 2/2020 | Canaphany | G09F 13/0463 | |

* cited by examiner

*Primary Examiner* — David R Dunn
*Assistant Examiner* — Christopher E Veraa
(74) *Attorney, Agent, or Firm* — David R. Conklin; Kirton McConkie

(57) ABSTRACT

Framing member for use in mounting and displaying a SEG product.

17 Claims, 20 Drawing Sheets

FRAMING SYSTEM FOR USE WITH SILICONE EDGE GRAPHICS

RELATED APPLICATIONS

This application is a continuation of U.S. patent application Ser. No. 17/171,911, entitled FRAMING SYSTEM FOR USE WITH SILICONE EDGE GRAPHICS, filed on Feb. 9, 2021, which claims priority to U.S. Provisional Patent Application Ser. No. 62/972,356, filed Feb. 10, 2020, each of which are incorporated herein by reference in their entirety.

BACKGROUND OF THE INVENTION

Silicone edge graphics (SEG) is a fabric material having a thin silicone strip (or welt/gasket) sewn or otherwise attached to the perimeter thereof. The thin silicone strip is used as an anchor to attach the SEG to a frame (a SEG frame) such that a viewable surface of the fabric material is displayed for viewing. In some instances, the viewable surface of the fabric material comprises a printed image. A SEG frame may include various features to accommodate a preferred orientation or presentation of the viewable surface. In some instances, a SEG frame includes features to accommodate flush mounting, standalone mounting, and/or hang mounting, as well as features to provide backlighting of the viewable surface.

A SEG frame generally comprises a plurality of pieces that must be modified prior to assembly. Modifications may include cutting the frame pieces to size, as well as precise drilling of access and pilot holes to facilitate fasteners by which the individual frame pieces are interconnected and/or mounted to a desired surface. These modifications require skill, training, specialized tools and cutting guides, as well as valuable time in order to achieve professional results, all of which increase the overall costs associated with using the SEG frame. Thus, while framing systems and methods exist for mounting and displaying SEG products, challenges remain. The present invention meets and overcomes these challenges.

BRIEF SUMMARY OF THE INVENTION

Any of the features described herein may be combined in order to arrive at a desired configuration in accordance with the explicitly stated and intended operation of the present invention. Use herein of the transitional phrases “in some embodiments”, “in some instances” and “in some implementations” is not intended to limit the scope of any particular embodiment to a specific feature or set of features disclosed therewith. Rather, the intention of all the various embodiments described herein is to provide frameworks of context in which a specific feature or a set of features may be comprehended and understood in the context of the inventive concept as a whole. Accordingly, the entirety of the present disclosure is to be understood as a body of interchangeable and modular elements that may be selected and combined (in accordance with the requisite purview of one having ordinary skill in the art) to achieve a device, system, or method within the context of the inventive concept, as a whole, disclosed herein.

The present invention relates to framing and mounting systems for SEG products. In particular, the present invention relates to various extruded frame pieces which may be used independently and/or in combination to provide framing and mounting systems for SEG products. The extruded frame pieces of the present invention are generally extruded aluminum, however other rigid metallic materials may be used, such as steel, as well as rigid polymer materials, such as polycarbonate, polyurethane, and polypropylene. In some instances, framing pieces of the present invention may be machined from solid or semi-solid stock. In some instances, framing pieces of the present invention may be shaped from malleable sheet materials. In some instances, framing pieces of the present invention may be formed using thermoplastic materials, either by extrusion, injection molding, and/or heat shaping processes.

The framing pieces of the present invention include various features and elements in a variety of combinations, orientations, and layouts configured to provide unique and useful options for mounting a SEG product. Some framing pieces of the present invention may be assembled with limited tools and modifications. Some framing pieces of the present invention are configured for assembly without requiring a drill, wherein the components are connected via mechanical compression and/or friction using a mechanical fastener coupled to at least one of a channel, a mounting plate, or a predrilled hole of the component.

For example, some framing pieces include mounting slots for receiving the head of a mechanical fastener, such as a T-bolt. Some framing pieces include receptacles for receiving a nut, wherein the receptacle prevents rotation of the nut while being threaded with a bolt. Some framing pieces include extensions for blocking light. Some framing pieces include fastener holes. Some framing pieces include chamfered or tapered edges to reduce shadows. Some framing pieces include a single receptacle for receiving a silicone bead of a SEG product. Some framing pieces include a plurality of receptacles for receiving a silicone bead of at least two SEG products. Some framing pieces include a plurality of receptacles separated by 120° and arranged for receiving three SEG products forming an outside corner of a cube. Some framing pieces include mounting surfaces for supporting a wall or other permanent structure or surface. Some framing pieces are configured for use with existing frame structures or systems.

Some framing pieces of the present invention are used in combination with other framing pieces to provide a two-dimensional mounting surface. Some framing pieces of the present invention are used in combination with other framing pieces to provide a three-dimensional mounting surface.

Some framing pieces of the present invention are configured to provide a butt joint between two SEG products such that the SEG products are displayed in a same viewing plane. Some framing pieces of the present invention are configured to join two SEG products along a single edge such that the SEG product are displayed in viewing planes that are 90° to one another. Some framing pieces of the present invention are configured to display two SEG products in viewing planes that are 180° to one another.

Various embodiments of the present invention provide mounting systems comprising a plurality of framing pieces assembled to provide a desired mounting surface. In some instances, the present invention provides a mounting system comprising a plurality of identical framing pieces. In some instances, the present invention provides a mounting system comprising a plurality of unique framing pieces. In some embodiments, at least four identical types or embodiments of framing members are attached at corresponding ends to provide a rectangular frame having a height and a width defining an area for receiving a SEG product. In some embodiments, the framing members are attached at respective ends using an attachment means, such as, for example a metal tenon or bar configured to insert within corresponding tracks or slots of the framing members, such as a t-track slot, wherein the attachment means is secured by a mechanical fastener, such as a set screw. In some instances, the attachment means is a linear metal tenon, bar or joint bracket fastener. In some instances, the attachment means is an elbow or right-angle metal tenon, bar or joint bracket fastener. In some instances, the attachment means is a t-shaped metal tenon, bar or joint bracket fastener. In some instances, the attachment means is a x-shaped metal tenon, bar or joint bracket fastener. Some framing members include a threaded channel configured to receive a threaded bolt at any location along a length of the threaded channel.

In a first aspect of the invention, a framing member is provided comprising a base having an outer surface, an inner surface, a distal end, and a front receptacle formed in the distal end and configured to receive a silicone bead of a SEG product, said inner surface comprising a chamfered surface in proximity to the front receptacle and tapered inwardly towards an opening of the front receptacle, the framing member further comprising a surface in proximity to the chamfered surface and configured to receive a light source. In some implementations of the invention, the inner surface of the base comprises the surface configured to receive a light source. In some implementations of the invention, the inner surface further comprises a second front receptacle positioned inwardly from the front receptacle and configured to receive a silicone bead of a second SEG product, the inner surface comprising a second chamfered surface in proximity to the second front receptacle and tapering outwardly towards the second front receptacle. In some implementations of the invention, the chamfered surface is configured to minimize a shadow on a SEG product mounted in the front receptacle when the framing member is used with a light source. In some instances, the framing member further includes a threaded channel in the outer surface of the base. In some implementations of the invention, the base comprises a proximal end opposite the distal end, said proximal end comprising a rear receptacle configured to receive a silicone bead of a second SEG product, wherein the second chamfered surface is configured to minimize a shadow on a second SEG product mounted in the rear receptacle when the framing member is used with a light source. In some instances, the framing member comprises a vertical member extending outwardly from and perpendicular to the base and comprising a second chamfered surface opposite the base and tapered outwardly from the base. In some instances, a vertical member of the framing member comprises a second surface receiving a light source, the second surface positioned between the base and the second chamfered surface, the second chamfered surface tapered away from the second surface. In some instances, the second surface is perpendicular to the base. In some instances, the second surface is parallel to the base. In some instances, the second surface comprises a channel. In some instances, the second surface comprises a raised edge opposite the second chamfered surface and between the second surface and the front receptacle, a portion of the raised edge being perpendicular to the base.

In a second aspect of the invention, a framing system is provided comprising a corner member comprising a body having a corner and three arms extending outwardly from the corner in x-, y- and z-axes, such that the three arms and corner form a corner of a cube shape, the corner further comprising a Y-shaped protrusion and three V-shaped plates positioned between the three arms, thereby providing three L-shaped receptacles between the Y-shaped protraction and the three V-shaped plates, a first L-shaped receptacle being positioned in an first plane of a cube shape, a second L-shaped receptacle being positioned in a second plane of a cube shape, and a third L-shaped receptacle being positioned in a third plane of a cube shape, wherein the second plane is perpendicular to the first plane, and wherein the third plane is perpendicular to the first and second planes, the framing system further comprising a plurality of edge members, each comprising a central channel configured to receive an arm of the corner member, outer surface of each edge member comprising a pair of parallel receptacles that align with and extend the respective L-shaped receptacles when the edge member is coupled to the corner member. In some implementations of the invention, an inner surface of each edge member comprising a channel for receiving a light source. In some implementations of the invention, a framing system comprises a plurality of corner members and an equivalent plurality of edge members to provide a complete cube shape having six sides. In some instances, a framing system comprises a chamfered edge on an outer surface of each L-shaped receptacle, and a chamfered edge on an outer surface of each of the parallel receptacles, wherein each chamfered edge tapers inwardly towards respective openings of each L-shaped receptacle and each of the parallel receptacles, wherein the chamfered edge extends along an entirety of a length of each L-shaped receptacle and each of the parallel receptacles.

In a third aspect of the invention, a framing member is provided for mounting a SEG product to an outside corner of a wall surface, wherein the framing member comprises a corner mount having two wall mounting surface oriented at 90° to one another; a light mounting surface located opposite the two wall mounting surfaces; and a first receptacle and a second receptacle coupled to a center of the corner mount and oriented at approximately 135° to the two wall mounting surfaces, said first and second receptacles being separated by a divider and configured to receive a silicone edge of a first SEG product and a second SEG product, respectively, wherein the first and second receptacles are parallel to one another along a length of the receptacles. In some instances, the first and second receptacles each comprise a chamfered edge on an outer surface of the first and second receptacles and taper inwardly towards respective openings of the first and second receptacles.

BRIEF DESCRIPTION OF THE SEVERAL VIEWS OF THE DRAWINGS

In order that the manner in which the above-recited and other features and advantages of the invention are obtained will be readily understood, a more particular description of the invention briefly described above will be rendered by reference to specific embodiments thereof which are illustrated in the appended drawings. These drawings depict only typical embodiments of the invention and are not therefore to be considered to limit the scope of the invention.

DETAILED DESCRIPTION OF THE INVENTION

Figure 1:
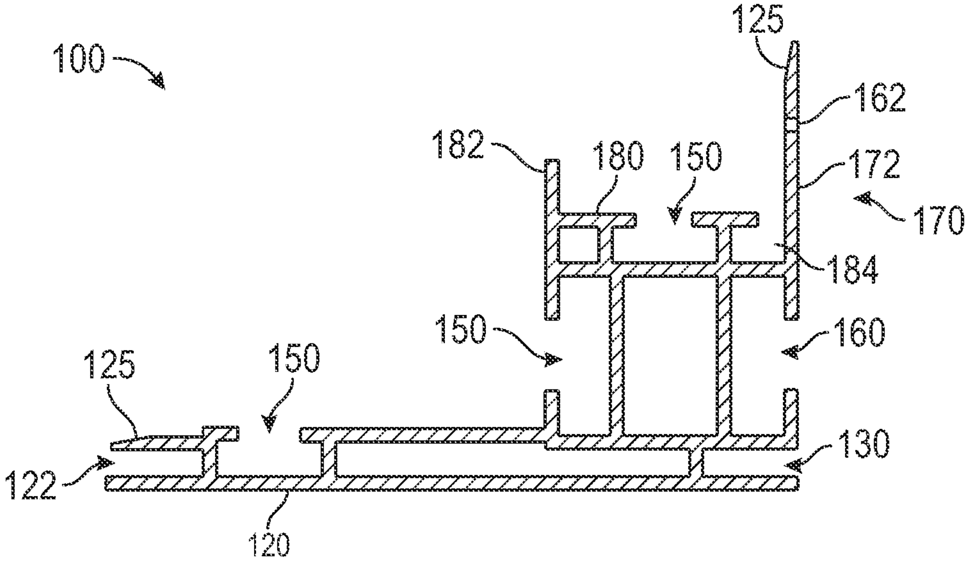
FIG. 1 depicts a cross-section view of a framing member for mounting and displaying a single SEG product n accordance with a representative embodiment of the present invention.
Figure 2:
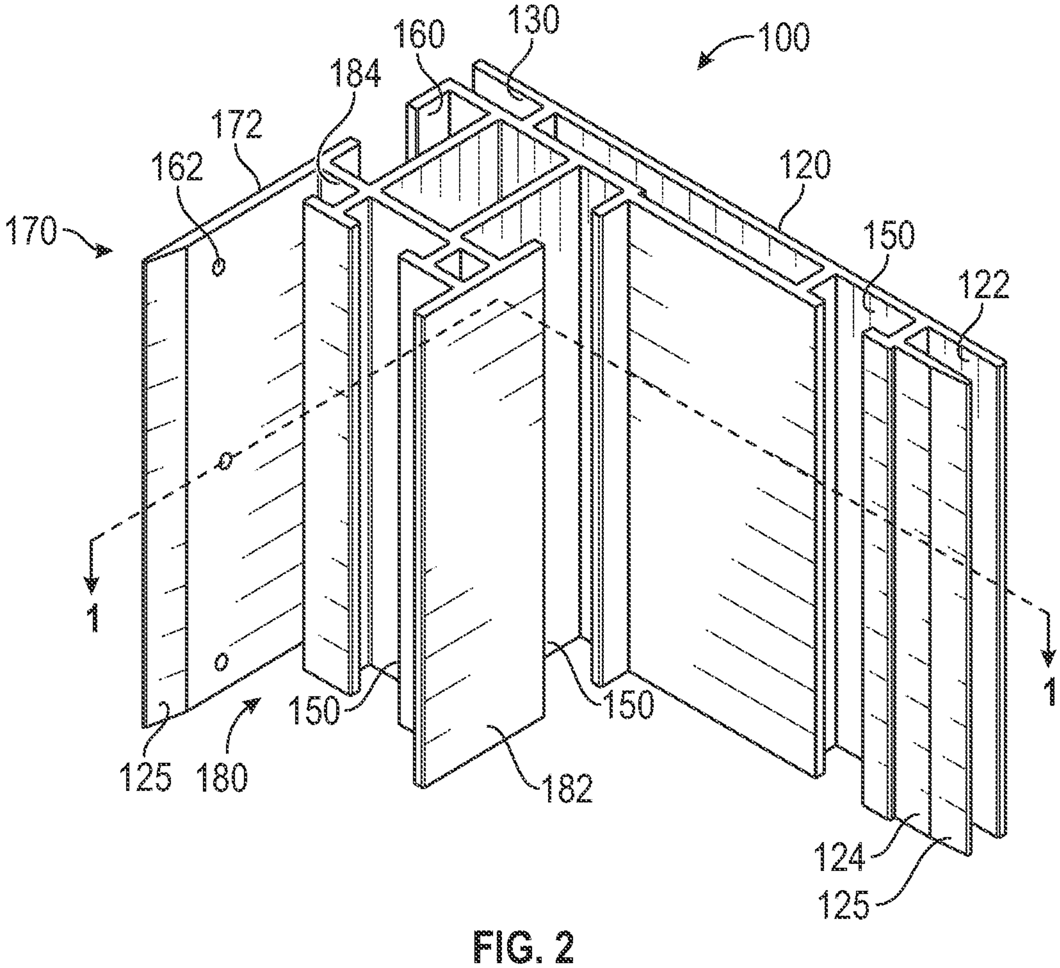
FIG. 2 depicts a perspective view of the framing member of FIG. 1.

The presently preferred embodiments of the present invention will be best understood by reference to the drawings, wherein like reference numbers indicate identical or functionally similar elements. It will be readily understood that the components of the present invention, as generally described and illustrated in the figures herein, could be arranged and designed in a wide variety of different configurations. Thus, the following more detailed description, as represented in the figures, is not intended to limit the scope of the invention as claimed, but is merely representative of presently preferred embodiments of the invention.

Referring now to FIGS. 1-4, various framing members (100, 200) are shown having features for mounting and displaying a SEG product. In some embodiments, framing members 100 and 200 comprise an L-shape having first and second arms in perpendicular orientation. Framing members 100 comprise a first arm 120 forming a base and having a front receptacle 122 for receiving a silicone bead of a SEG product, wherein an interior wall 124 of front receptacle 122 includes a tapered or chamfered back surface 125 configured to eliminate or reduce shadows on a mounted SEG product. First arm 120 further comprises a channel 150 configured to receive at least one of a light source and a mechanical fastener.

In some embodiments, first arm 120 further comprises a rear receptacle 130 configured to receive a silicone edge of a second SEG product, wherein the second SEG product is configured to enclose a rear opening of the assembled framing members. In some embodiments, a frame of assembled framing members is configured for use in a free-standing configuration, such that it is desirable to enclose a rear opening of the assembled framing members with a SEG covering material. In some embodiments, a SEG covering material comprises a material that is opaque to light transmission. In some embodiments, an interior surface of a SEG covering material is light reflective, such that light is reflected off the SEG covering material an onto the SEG product mounting in the front receptacle 122.

In some embodiments, the assembled framing members are mounted onto a solid material, such as a wall, using mounting hardware configured to selectively couple to a mounting track 160 located on a vertical member or second arm 170, wherein second arm 170 is perpendicular to first arm 120. In some embodiments, second arm 170 comprises a mounting plate 172 having a mounting hole 162 through which a fastener, such as a nail or screw, may be inserted to secure framing members 100 directly to a solid material. Second arm 170 may further include a channel 150 configured to receive at least one of a tight source and a mechanical fastener. Second arm 170 may further include a light mounting surface 180 having a channel 150 configured to receive a light source, such as individual lights and/or a light bar having a plurality of lights. Light mounting surface 180 further comprises a raised edge 182 configured to block and/or diffuse harsh light emitted from a light source mounted therein, such that light mounting surface 180 is defined by a space between raised edge 182 and a mounting plate 172 of second arm 170. In some embodiments, light mounting surface 180 further comprises a channel or slot 184 configured to retain wiring of a light source mounted therein.

Figure 3:
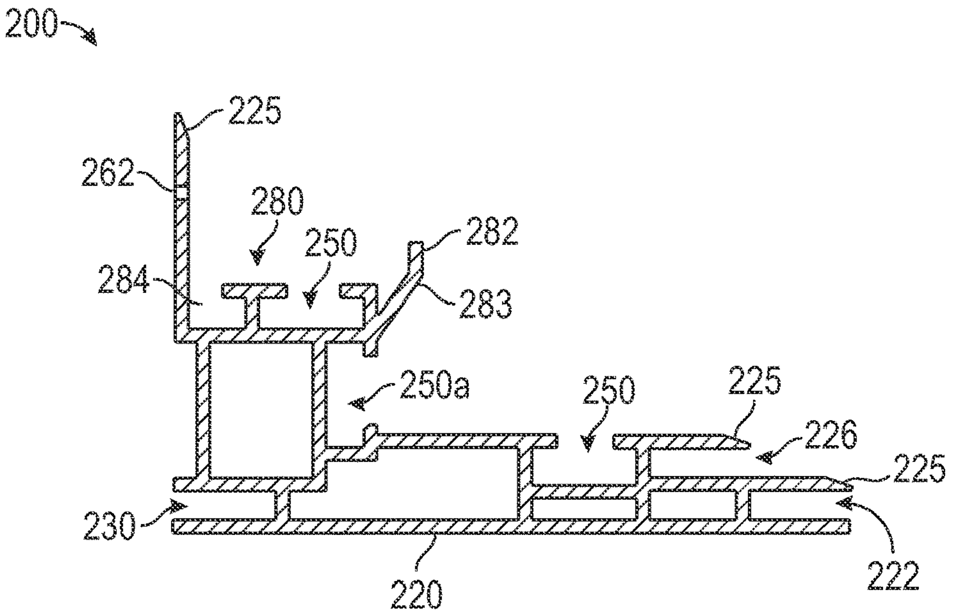
FIG. 3 depicts a cross-section view of a framing member for mounting and displaying a single SEG product in accordance with a representative embodiment of the present invention.
Figure 4:
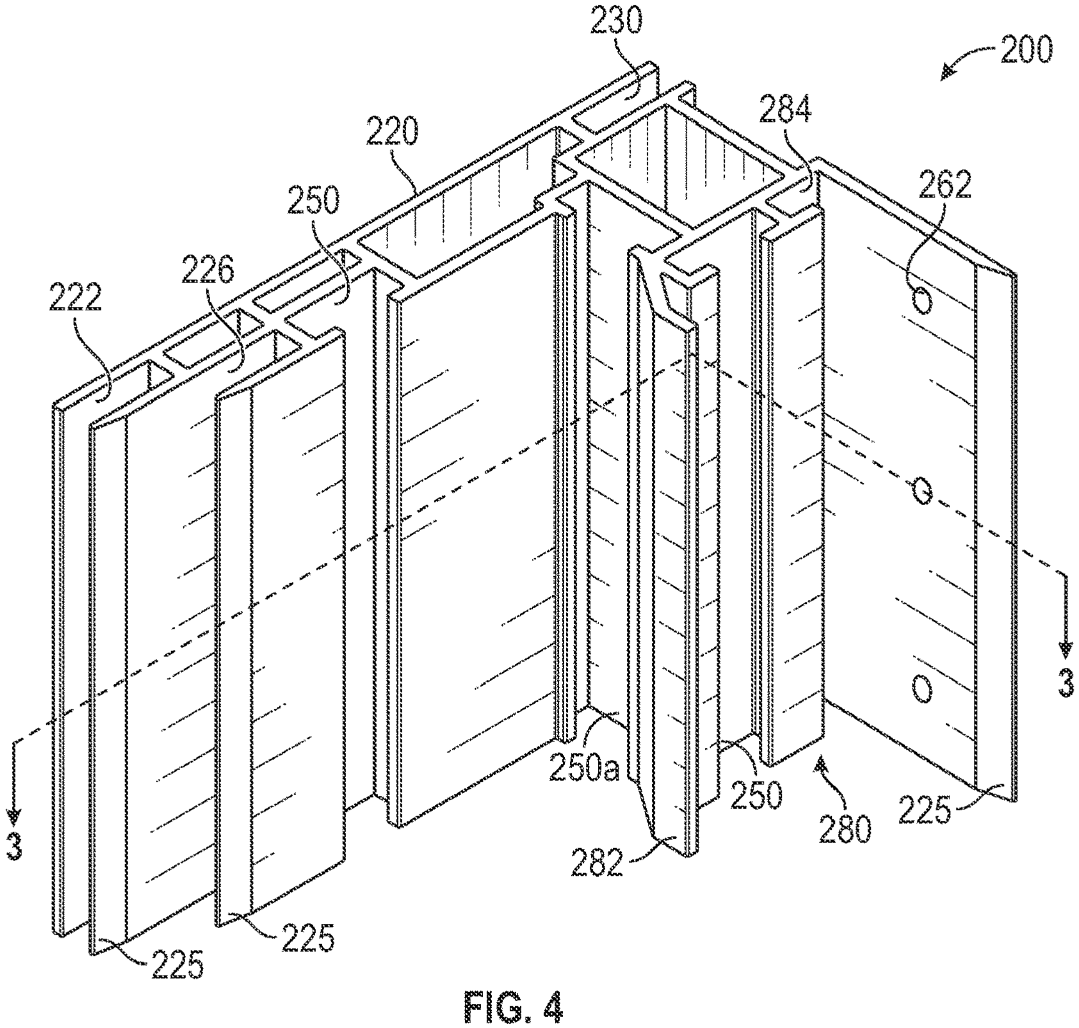
FIG. 4 depicts a perspective view of the framing member of FIG. 3.
Figure 5:
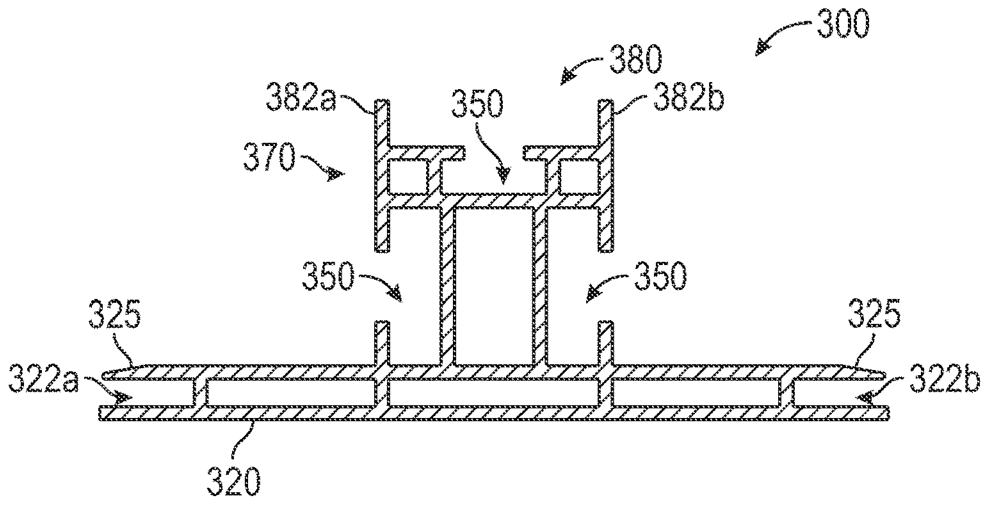
FIG. 5 depicts a cross-section view of a framing member for mounting and displaying two SEG products in a back-to-back orientation in accordance with a representative embodiment of the present invention.
Figure 6:
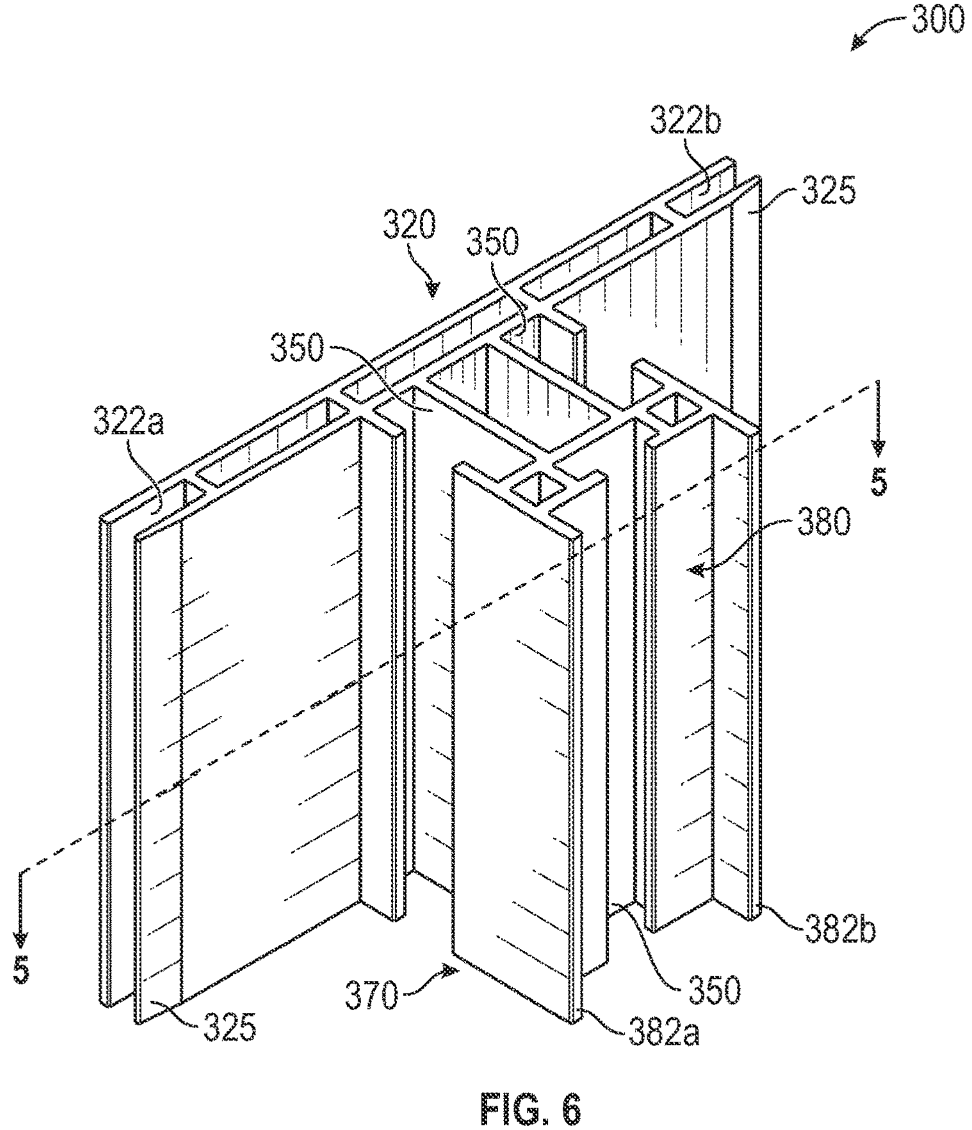
FIG. 6 depicts a perspective view of the framing member of FIG. 5.
Figure 7:
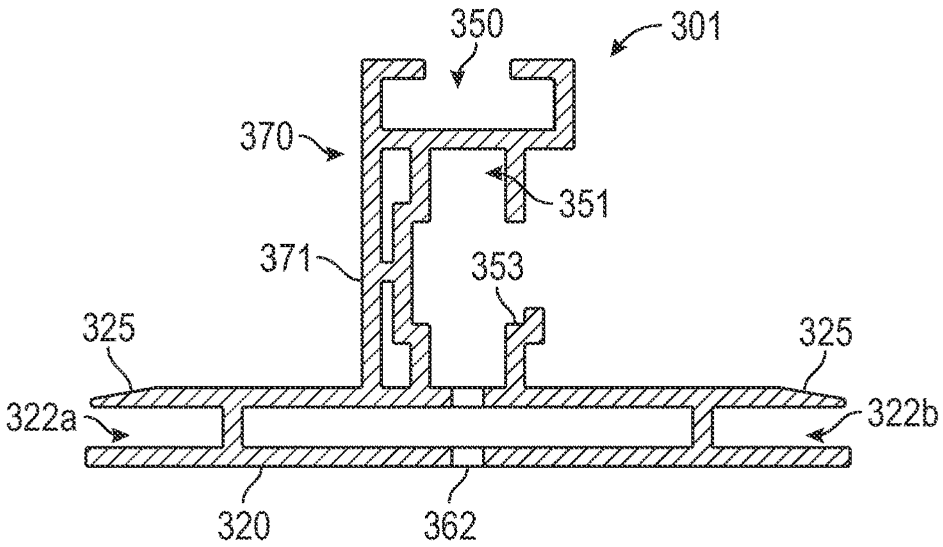
FIG. 7 depicts a cross-section view of a framing member for mounting and displaying two SEG products in a back-to-back orientation and comprising a centered channel in accordance with a representative embodiment of the present invention.
Figure 8:
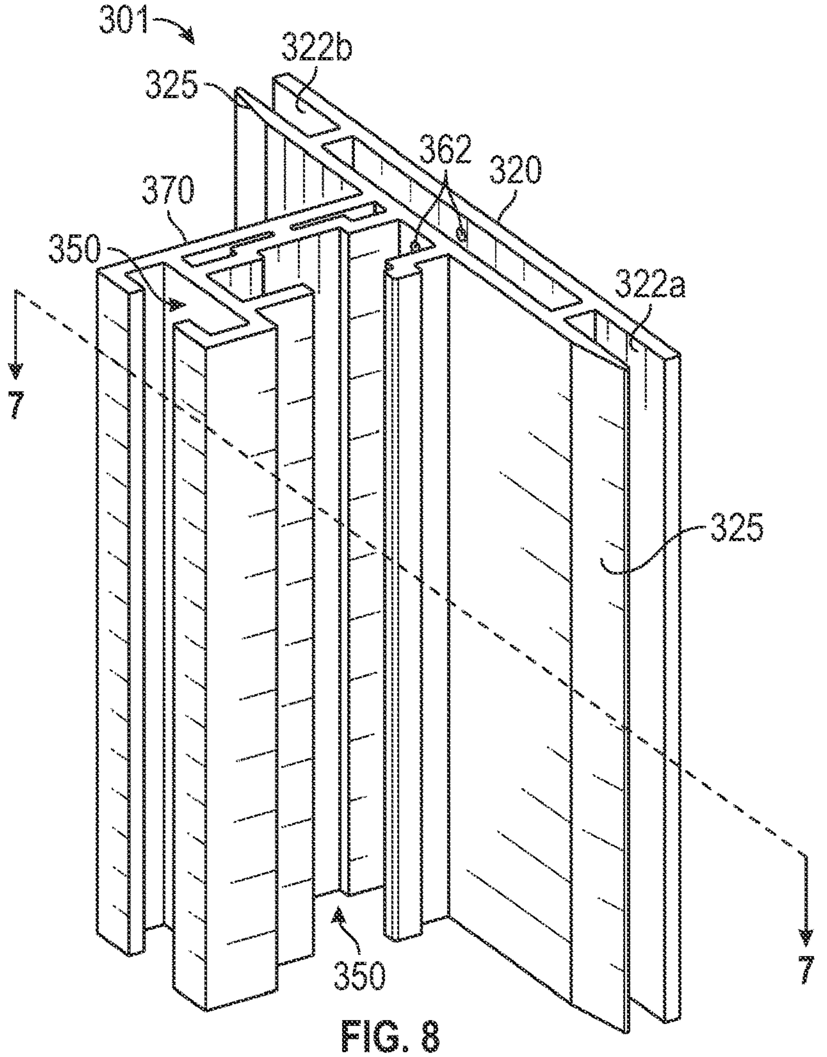
FIG. 8 depicts a perspective view of the framing member of FIG. 7.
Figure 9:
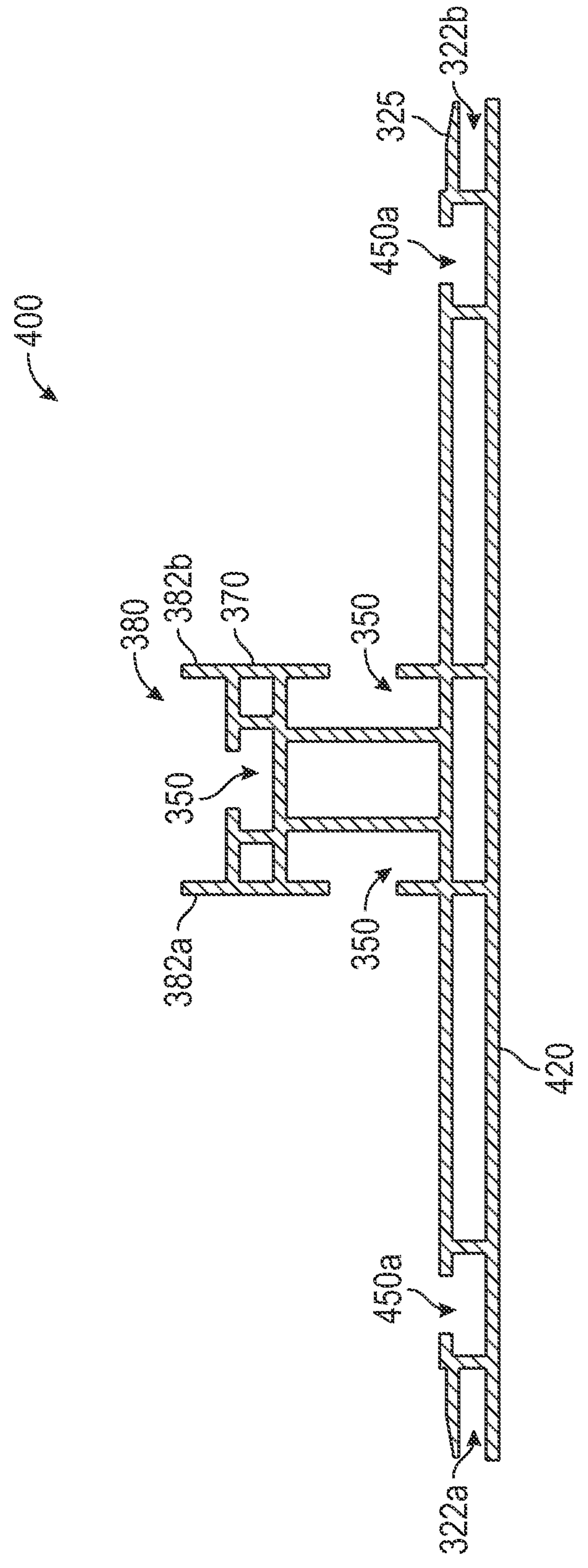
FIG. 9 depicts a cross-section view of a framing member for mounting and displaying two SEG products in a back-to-back orientation in accordance with a representative embodiment of the present invention.
Figure 10:
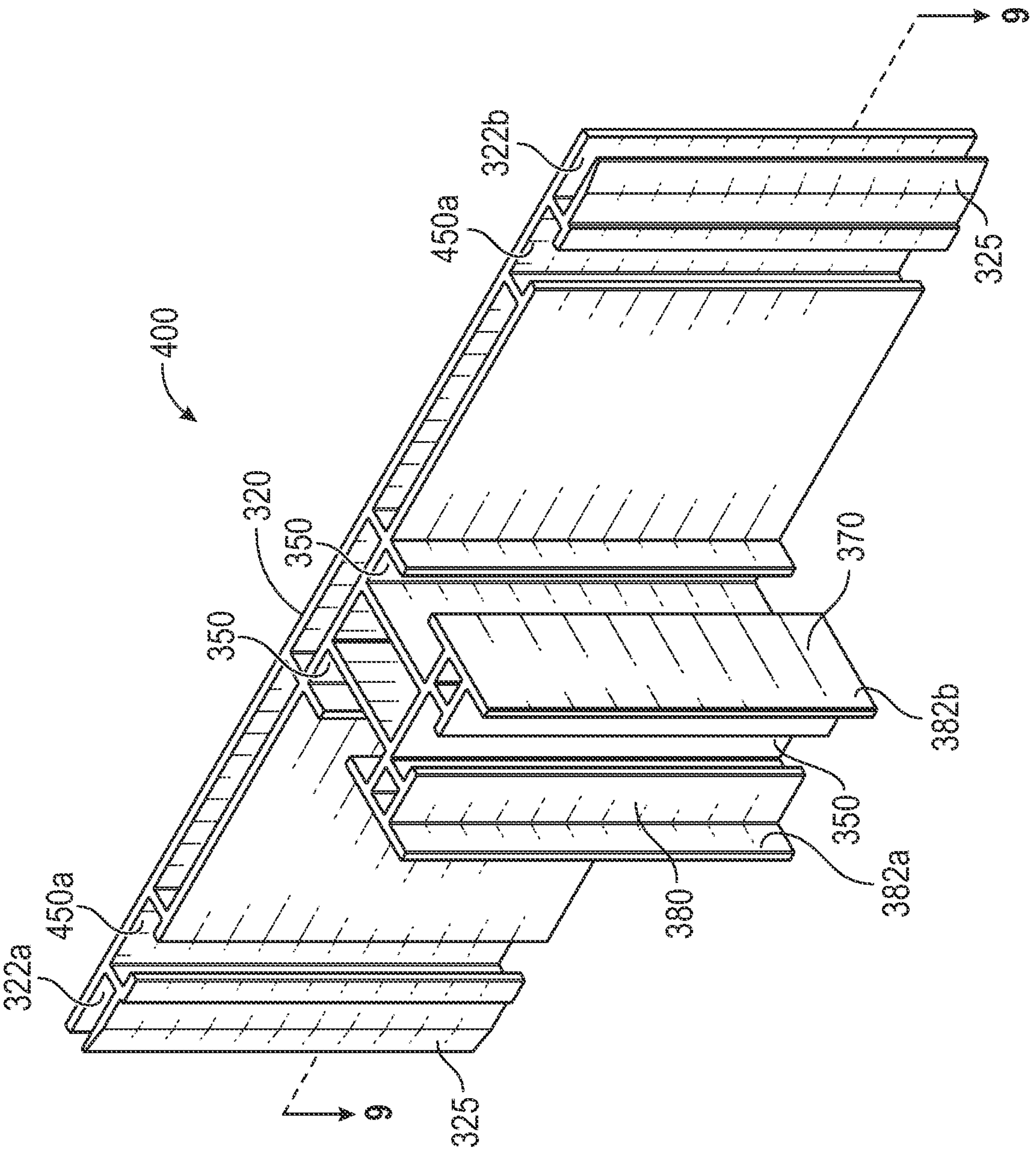
FIG. 10 depicts a perspective view of the framing member of FIG. 9.
Figure 11:
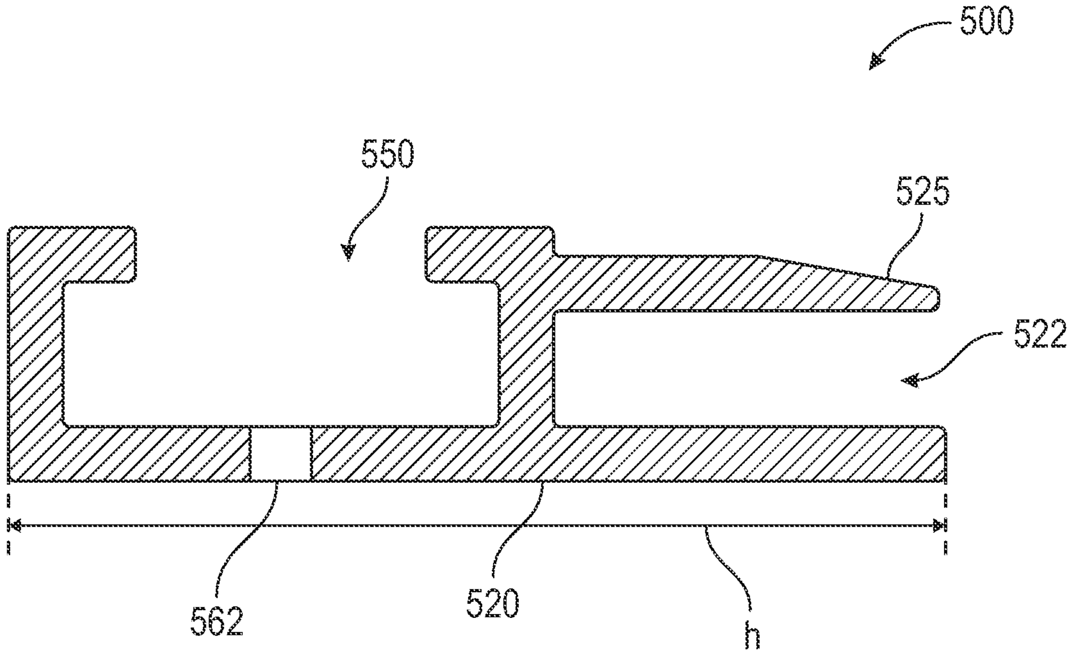
FIG. 11 depicts a cross-section view of a framing me tuber for mounting and displaying a single SEG product on a wall surface in accordance with a representative embodiment of the present invention.
Figure 12:
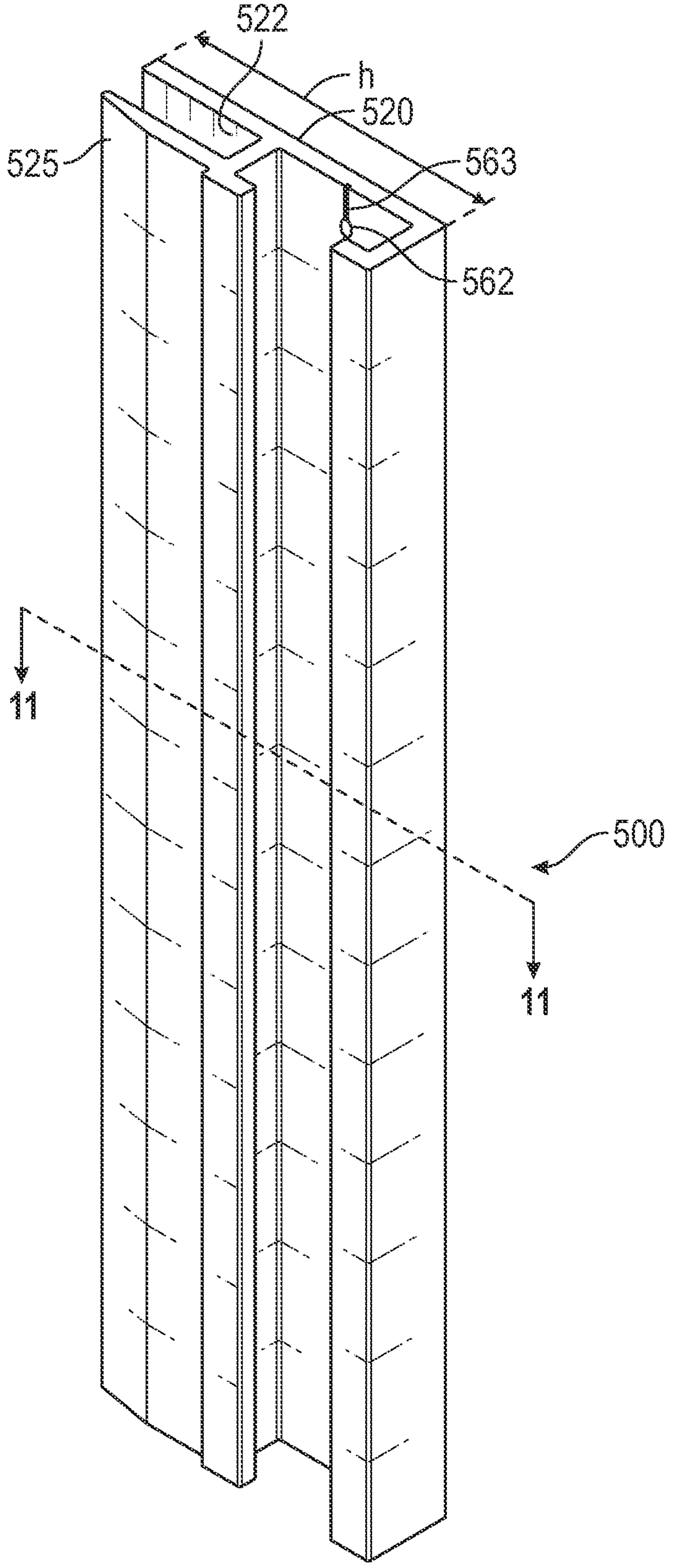
FIG. 12 depicts a perspective view of the framing member of FIG. 11.
Figure 13:
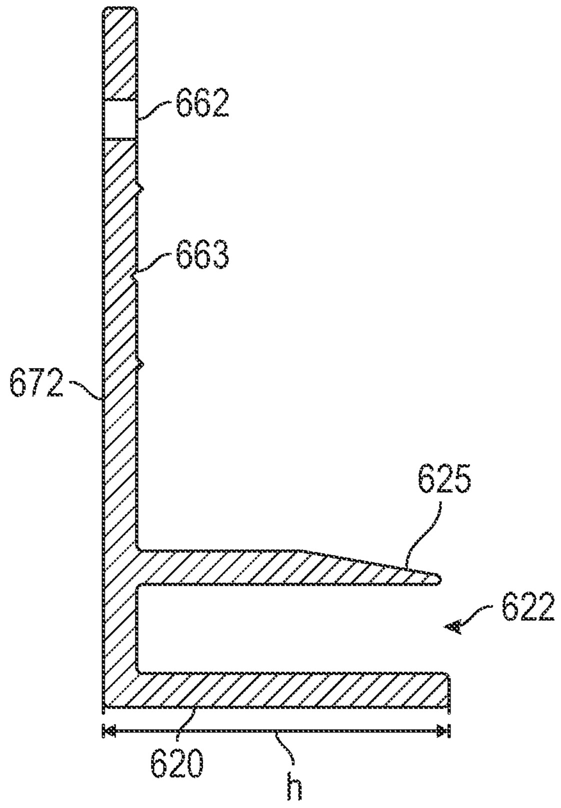
FIG. 13 depicts a cross-section view of a framing member having an F-shape and configured for mounting and displaying a single SEG product on a wall surface in accordance with a representative embodiment of the present invention.
Figure 14:
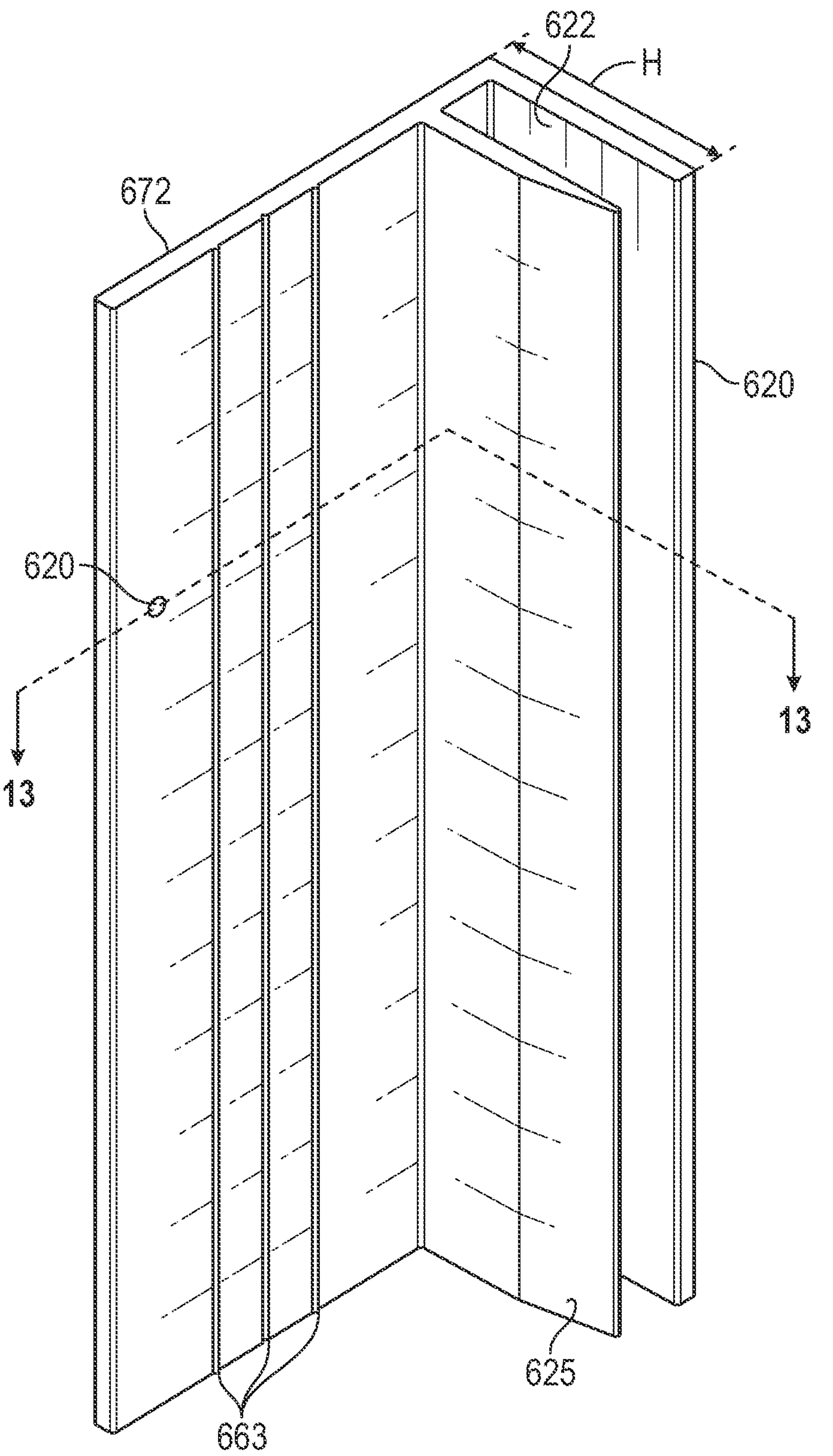
FIG. 14 depicts a perspective view of the framing member of FIG. 13.
Figure 15:
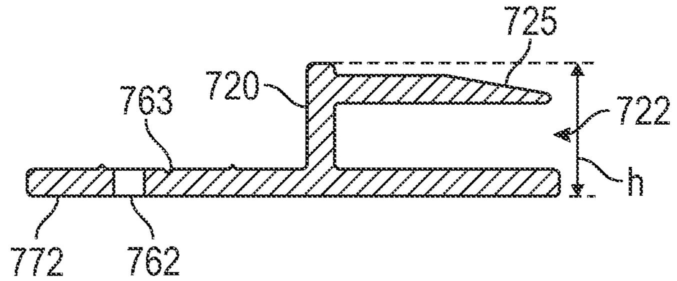
FIG. 15 depicts a cross-section view of a framing member having an H-shape and configured for mounting and displaying a single SEG product on a wall surface in accordance with a representative embodiment of the present invention.
Figure 16:
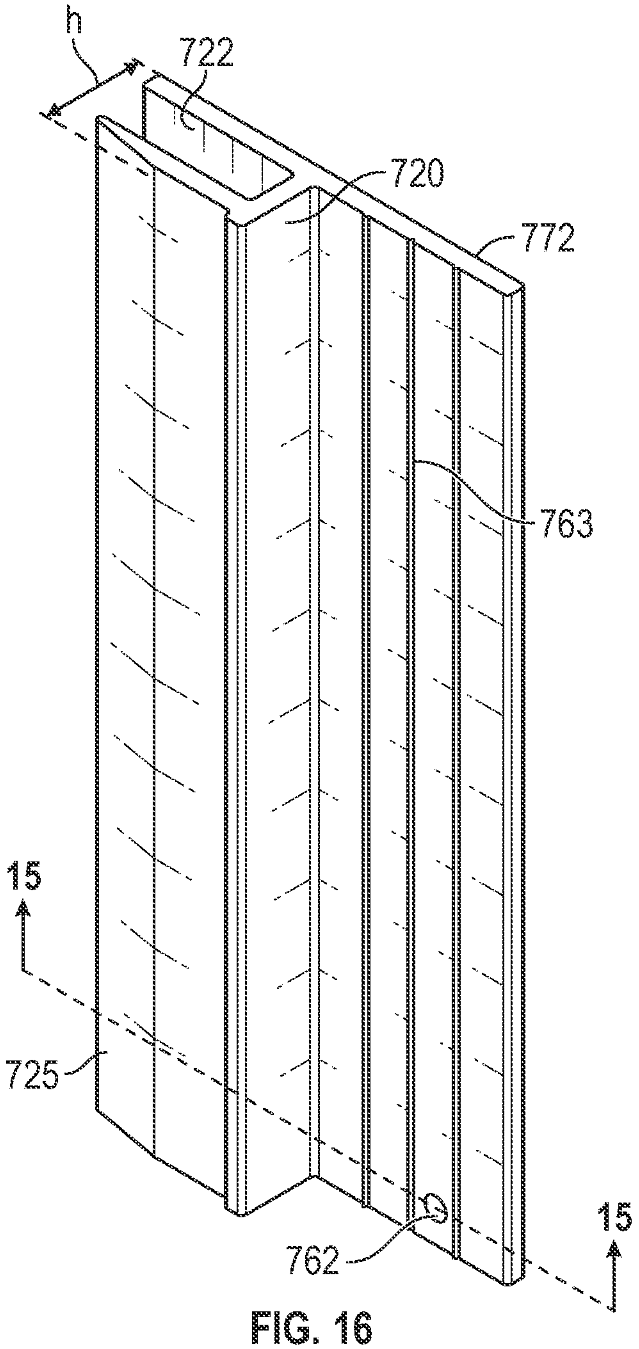
FIG. 16 depicts a perspective view of the framing member of FIG. 15.
Figure 17:
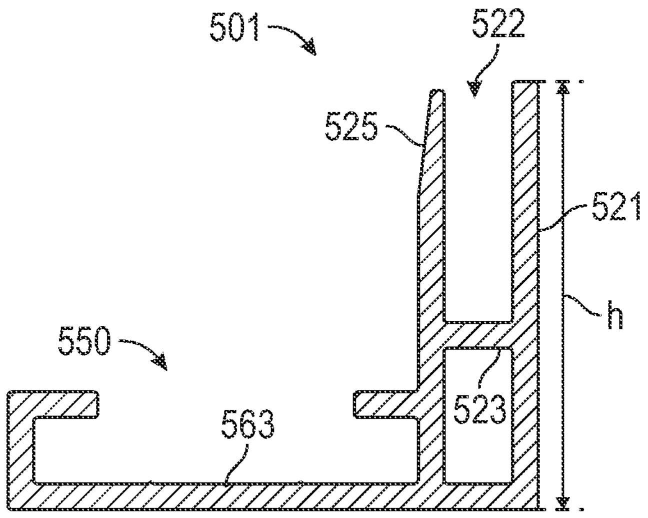
FIG. 17 depicts a cross-section view of a framing member having a modified F-shape and configured for mounting and displaying a single SEG product on a wall surface in accordance with a representative embodiment of the present invention.
Figure 18:
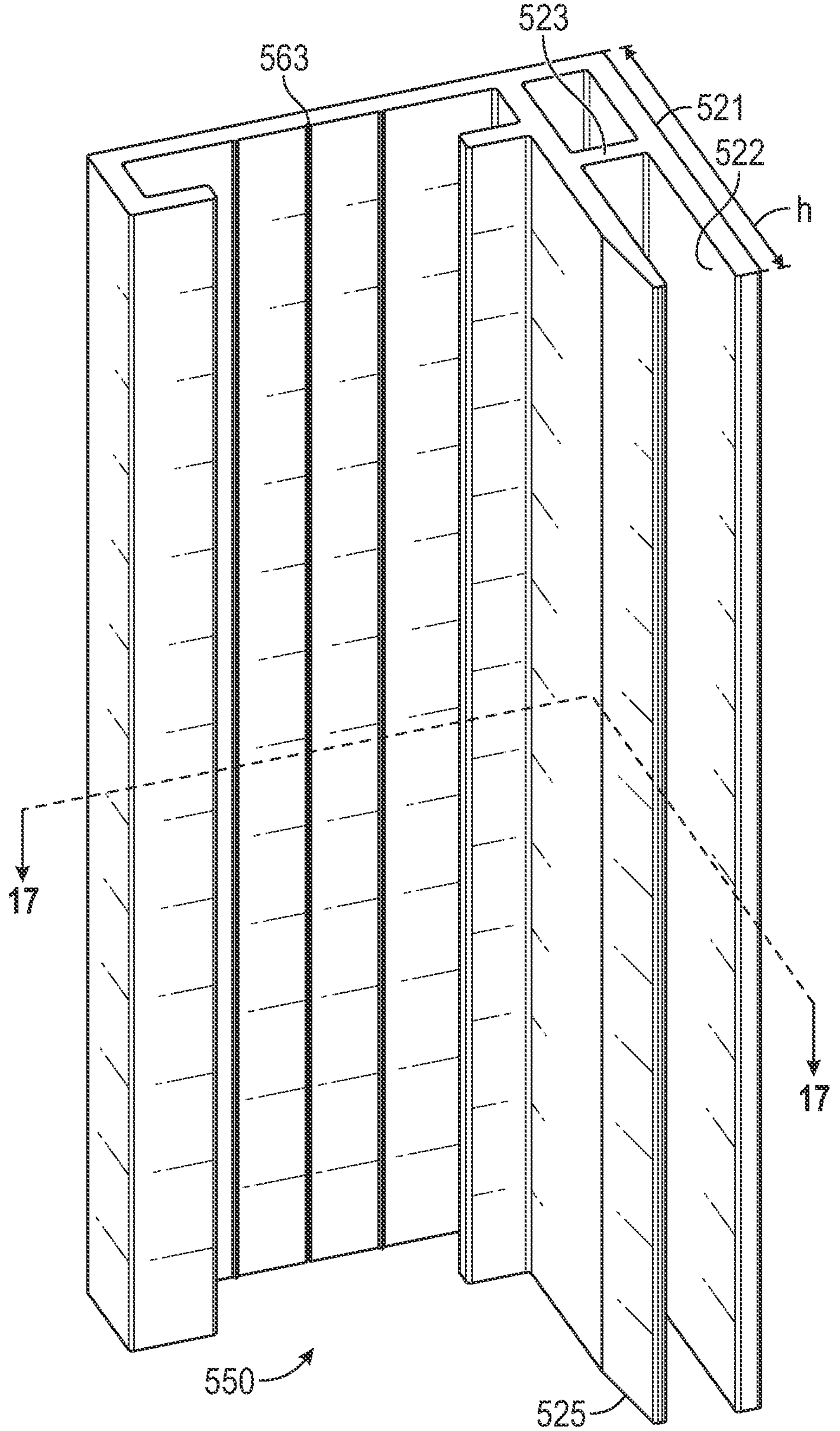
FIG. 18 depicts a perspective view of the framing member of FIG. 17.

In some embodiments, first arm 220 further comprises a secondary front receptacle 226 positioned inwardly from front receptacle 222, and configured to receive a secondary SEG product or placement behind a first SEG product mounted into front receptacle 222, as shown in FIGS. 3 and 4. In some embodiments, a first SEG product may comprise a printed design or image, and a second SEG product may comprise a color or level of transparency for coloring and/or diffusing a light source prior to illuminating the first SEG product. Secondary front receptacle 226 further comprises a tapered or chamfered edge 225 to reduce shadowing. In some embodiments, raised edge 282 is angled outwardly from light mounting surface 280 such a back surface 283 of raised edge 282 is tapered or angle relative to channel 250*a* to prevent shadowing when a light source is mounted in channel 250*a*.

Referring now to FIGS. 5-10, various framing members (300, 301, 400) are shown having features for mounting and displaying forward and rearward facing SEG products. In some embodiments, framing member 300, 301 comprises a T-shape having a horizontal member or first arm 320 forming a base that is oriented perpendicular to a vertical member or second arm 370 that extends upwardly from a middle or central location of first arm 320. First arm 320 comprises forward and rearward receptacles 322*a* and 322*b*. Second arm 370 comprises channels 350 for receiving at least one of a mechanical fastener and/or a light source. Second arm 370 further comprises a light mounting surface 380 having a channel 350, and further comprising a forward raised edge 382*a* and a rearward raised edge 382*b*, each configured to prevent shadowing on the forward and rearward facing SEG products, respectively. In some embodiments, second arm 370 comprises a stanchion 371 that is offset from the middle of first arm 320, such that a vertically oriented channel 351 is centered at the middle of first arm 320. In some embodiments, first arm 320 comprises a mounting hole 362 extending through first arm 320 and located within channel 351. Channel 351 further comprises a receptacle or channel 353 configured to receive a mechanical faster in a manner that prevents axial rotation of the fastener without the use of additional tools. For example, in some embodiments channel 353 is configured to receive a nut. In some embodiments, mounting hole 362 comprises a plurality of predrilled mounting holes along a length of framing member 301. In some embodiments, first arm 420 of framing members 400 further comprise channels 450*a* configured to receive a mechanical fastener.

Referring now to FIGS. 11-18, various framing members (500, 501, 600, 700) are provided having a low profile. In some embodiments, framing members 500, 510, 600, 700 comprise a base 520, 521, 620, 720 configured to form an outer, exposed edge when the respective members are assembled and a SEG product is coupled to receptacles 522, 622, 722. Accordingly, when framing members 500, 501, 600, 700 are mounted to a solid surface, such as a wall, the SEG product is spaced from the wall a distance approximately equal to height h of base 520, 521, 620, 720.

In some embodiments, framing member 500, 501 comprises a channel 550 for receiving at least one of a mechanical fastener and a light source. In some embodiments, channel 550 further comprises a mounting hole 562 for receiving a fastener, such as a nail or screw. In some embodiments, channel 550 comprises a centrally scribed reference line 563 to indicate a location at which a fastener may be driven to mount frame member 500 to a solid surface. In some embodiments, channel 550 and receptacle 522 of framing member 500 are arranged linearly such that channel 550 is aligned with and parallel to receptacle 522. In some embodiments, framing member 501 comprises an L-shape such that channel 550 is perpendicular to receptacle 522. Base 521 may comprise any desired height, and in some embodiments further comprises a support 523 configured to maintain a desired width and depth of receptacle 522. In some instances, base 521 comprises two or more supports 523.

In some embodiments, framing member 600 comprises an F-shape having a mounting plate 672 in a plane parallel to a plane of display for a SEG product coupled to receptacle 622. In some embodiments, mounting plate 672 comprises a mounting hole 662. In some embodiments, mounting plate 672 comprises one or more scribed reference lines 663 to indicate a location at which a fastener may be driven to mount frame member 600 to a solid surface.

In some embodiments, framing member 700 comprises an H-shape having a mounting plate 772 in a plane perpendicular to a plane of display for a SEG product coupled to receptacle 722. In some embodiments, mounting plate 772 comprises a mounting hole 762. In some embodiments, mounting plate 772 comprises one or more scribed reference lines 763 to indicate a location at which a fastener may be driven to mount frame member 700 to a solid surface.

Figure 19:
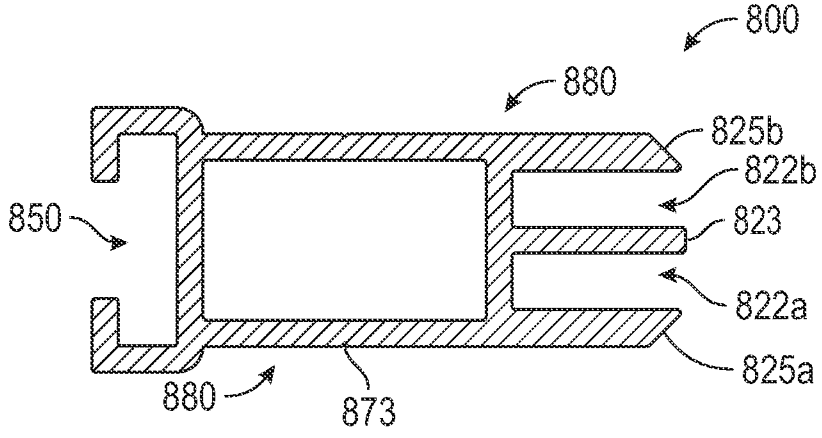
FIG. 19 depicts a cross-section view of a framing member configured for mounting and displaying two SEG products in a side-by-side orientation in accordance with a representative embodiment of the present invention.
Figure 20:
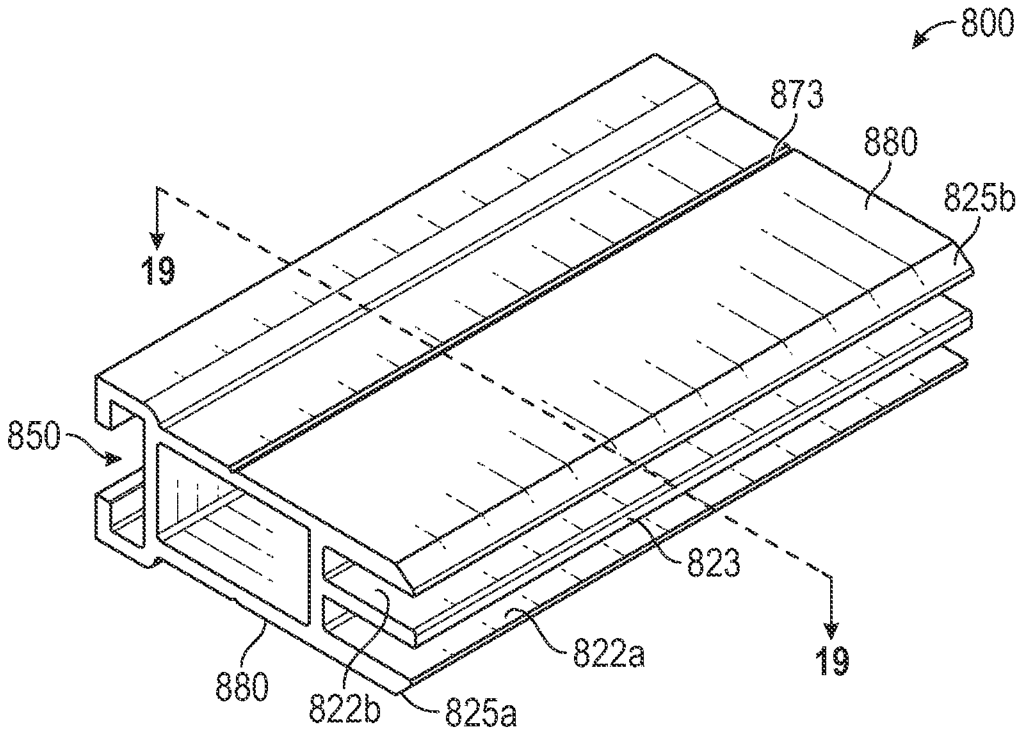
FIG. 20 depicts a perspective view of the framing member of FIG. 19.

In some instances, it may be desirable to display a first SEG product aside a second SEG product. Referring now to FIGS. 19-22, various framing members (800, 900) are provided to attach two SEG products along their respective edge surfaces. With reference to FIGS. 19 and 20, framing member 800 is configured to receive and display two SEG products side-by-side in a same viewing plane, such that a butt joint is formed between the two SEG products. Framing member 800 comprises a channel 850 for receiving at least one of a mechanical fastener and a light source. In some instances, channel 850 is capable of securing framing member 800 to a secondary framing member via a mechanical fastener. Framing member 800 further comprises light mounting surfaces 880 which are configured to receive a light source in an orientation that is parallel to a viewing plane of the first and second SEG products. In some embodiments, light mounting surface 880 further comprises a scribed reference line 873 to assist in aligning and securing a light source to surface 880 via a mechanical fastener, such as a screw. Framing member 800 comprises a first receptacle 822*a* and a second receptacle 822*b* for receiving a silicone bead of a first SEG product and a second SEG product, respectively. First and second receptacles 822*a*, 822*b* are separated by divider 823. Framing member 800 further comprises tapered or chamfered edges 825*a* and 825*b* to reduce shadowing on first and second SEG products, respectively.

Figure 21:
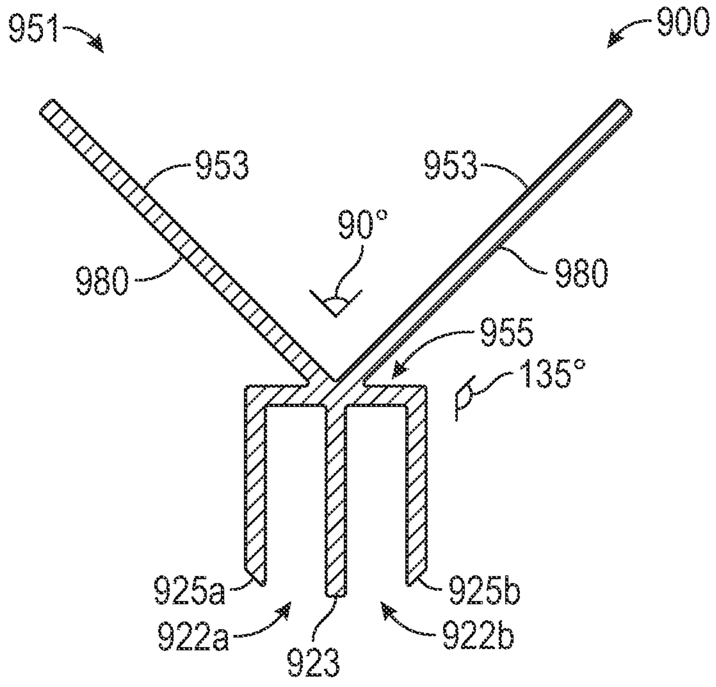
FIG. 21 depicts a cross-section view of a framing member configured for mounting and displaying two SEG products to a corner of a wall surface in accordance with a representative embodiment of the present invention.
Figure 22:
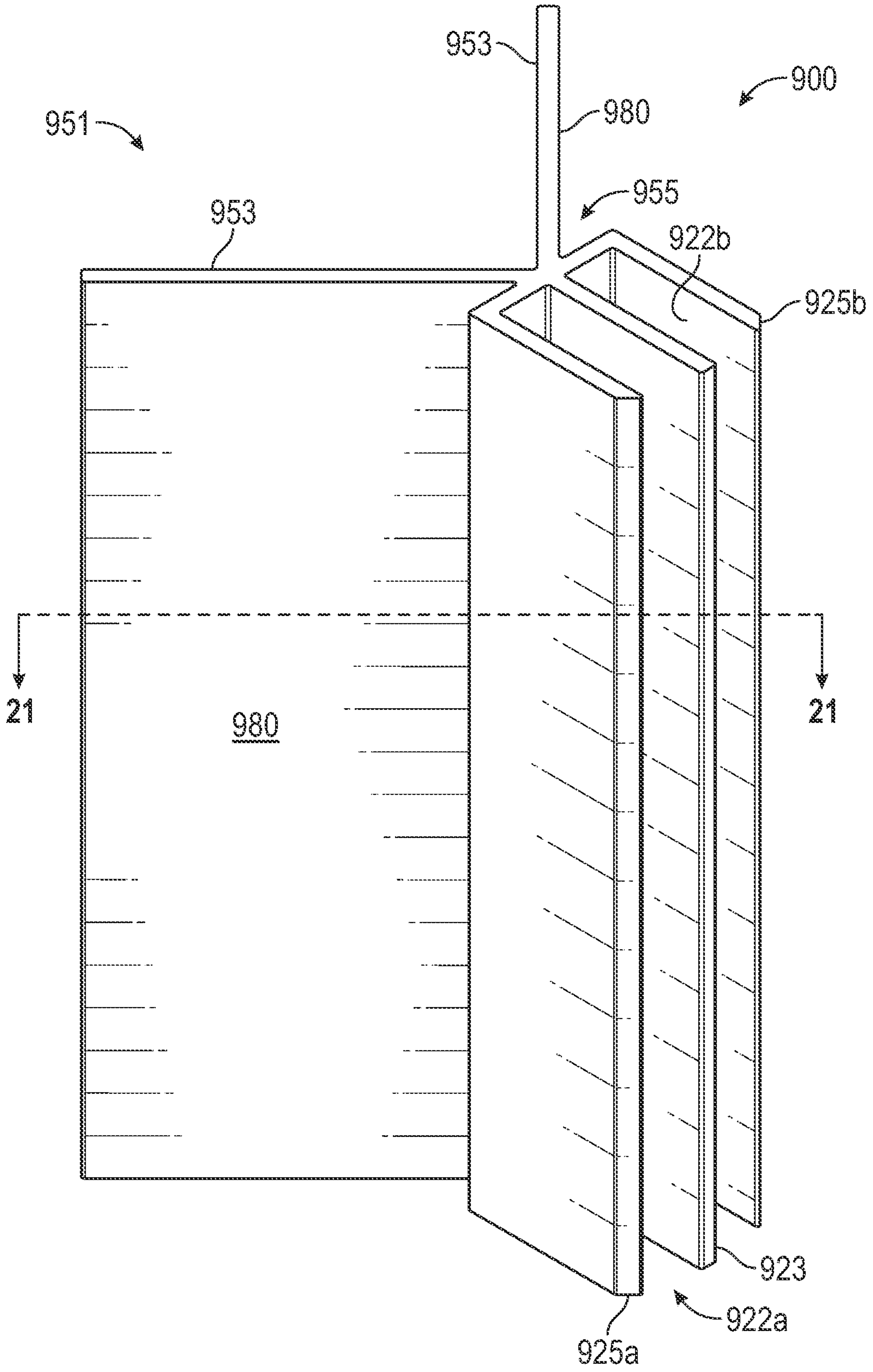
FIG. 22 depicts a perspective view of the framing member of FIG. 21.

With reference to FIGS. 21 and 22, framing member 900 is configured to receive and display two SEG products in two viewing planes that are 90° to one another, such that a mitered corner is formed between the two SEG products. In particular, framing member 900 is configured for use in mounting two SEG products to a corner of a wall surface, wherein framing member 900 comprises a corner mount 951 having two wall mounting surfaces 953 oriented at 90° to one another and joined at a center 955. Framing member 900 further comprises light mounting surfaces 980 located opposite wall mounting surfaces 953. Framing member 900 comprises first and second receptacles 922*a* and 922*b* coupled to and extending outwardly from center 955. Receptacles 922*a* and 922*b* are separated by a divider 923. Receptacles 922*a* and 922*b* are configured for receiving a silicone edge of a first and second SEG product, respectively, wherein each receptacle comprises a tapered outer edge surface 925*a* and 925*b* which provides clearance for the respective SEG product when mounted therein. Receptacles 922*a* and 922*b* are parallel to one another and oriented at approximately 135° to wall mounting surfaces 953.

Figure 23A:
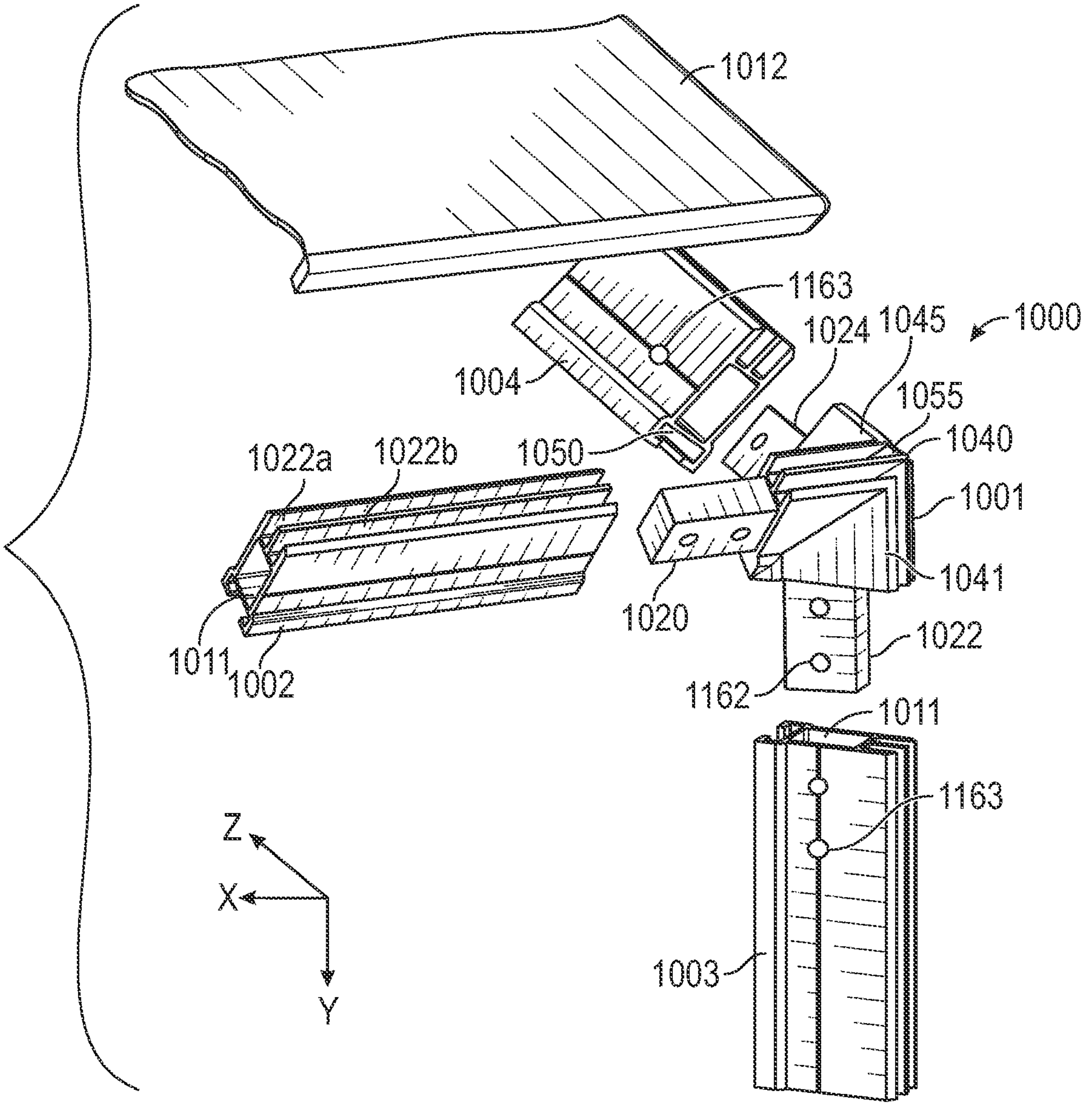
FIG. 23A depicts an exploded perspective view of a framing system configured for mounting and displaying three SEG products in three faces forming a corner of a cube in accordance with a representative embodiment of the present invention.
Figure 23B:
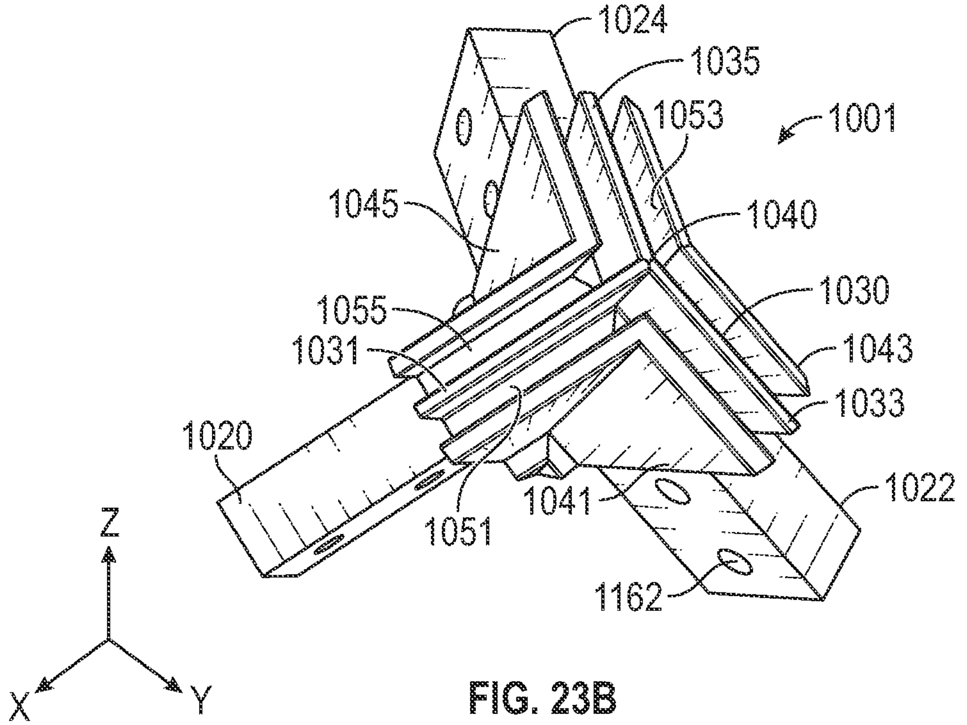
FIG. 23B depicts a detailed perspective view of a corner member of framing system of FIG. 21A.
Figure 23C:
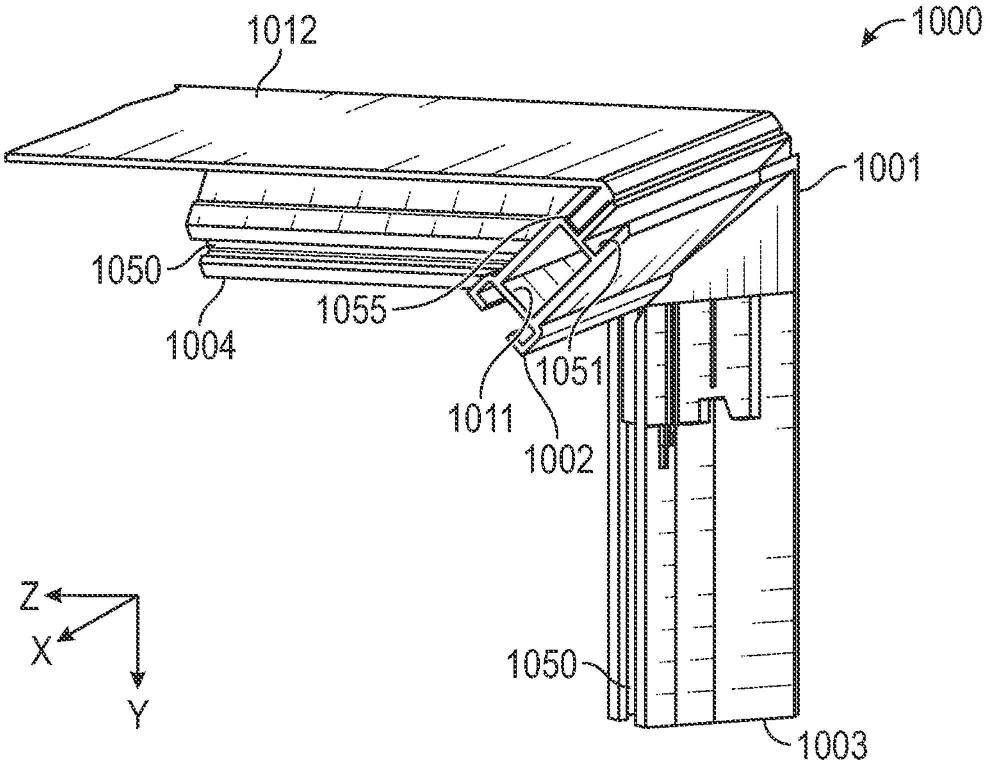
FIG. 23C depicts an assembled perspective view of the framing system of FIG. 21A.

In some instances, it may be desirable to display three SEG products in a cube configuration, such that the three SEB products than outside corner of a cube shape. Referring now to FIGS. 23A-23C, framing member 1000 is provided to attach three SEG products 1012 along their respective edge surfaces. Framing member 1000 comprise a corner member 1001 configured to selectively couple three edge members 1002, 1003, 1004 (equivalent to framing member 800 in FIGS. 19 and 20), such that edge members 1002, 1003, 1004 are arranged in x-, y- and z-axes, respectively. When three SEG products 1012 are coupled to corner member 1001 and edge members 1002, 1003, 1004, the SEG products 1012 are arranged in x-, y- and z-planes, thereby forming a corner of a cube shape.

Corner member 1001 comprises a body having a Y-shaped outwardly extended protrusion 1030 consisting of three arms 1031, 1033, 1035 each separated by 120° from the adjacent arms and forming a corner 1040 at the center of the three arms. Arms 1031, 1033 and 1035 are arranged in x-, y- and z-axes such that the three arms and corner 1040 form a corner of a cube shape. The body of corner member 1001 further comprises V-shaped plates 1041, 1043 and 1045 positioned between arms 1031 and 1033, between arms 1033 and 1035, and between arms 1035 and 1031, respectively, such that a first L-shaped receptacle 1051 is provided between plate 1041 and arms 1031 and 1033, a second L-shaped receptacle 1053 is provided between plate 1043 and arms 1033 and 1035, and a L-shaped third receptacle 1055 is provided between plate 1045 and arms 1035 and 1031. A first half of first receptacle 1051 is oriented in the x-axis and a second half of first receptacle 1051 is oriented in the y-axis, a first half of the second receptacle 1053 is oriented in the y-axis (opposite the second half of first receptacle 1051) and a second half of the second receptacle 1053 is oriented in the z-axis, and a first half of the third receptacle 1055 is oriented in the z-axis (opposite the second half of second receptacle 1053), and a second half of the third receptacle 1055 is oriented in the x-axis (opposite the first half of first receptacle 1051), wherein the first and second halves of the first, second and third receptacles are defined by corner 1040. In some embodiments, corner member 1001 comprises a chamfered edge on an outer surface of each L-shaped receptacle, wherein the chamfered edge tapers inwardly towards the opening of each L-shaped receptacle.

Corner member 1001 further comprises three extension 1020, 1022, 1024 extending outwardly from first, second and third arms 1031, 1033, 1035, respectively, such that arms 1031, 1033 and 1035 are interposed between extensions 1020, 1022, 1024 and corner 1040. Extensions 1020, 1022, 1024 are configured to couple edge members 1002, 1003 and 1004, respectively. Extensions 1020, 1022, 1024 may comprise any shape or configuration. In some embodiments, extensions 1020, 1022, 1024 comprise mounting holes 1162 for securing edge members 1002, 1003, 1004 thereto, wherein corresponding mounting holes 1163 are provided in the edge members.

Framing member 1000 is assembled by selectively coupling edge members 1002, 1003, 1004 to extensions 1020, 1022, 1024 to form a frame having a corner shape of a cube, as shown in FIG. 23C. Edge members 1002, 1003, 1004 comprise a central channel 1011 configured to receive extensions 1020, 1022, 1024, respectively. In some embodiments, corner member 1001 comprises a surface configured to insert within a channel 1050 of the edge members. In some embodiments, a surface or feature of extensions 1020, 1022, 1024 is configured to coupled to channel 1050, such that corner member 1001 is coupled to an edge member via central channel 1011 and channel 1050. Edge members 1002, 1003, 1004 may further be secured to corner member 1001 via one or more fasteners and mounting holes 1162. Edge members 1002, 1003, 1004 each comprise a pair of parallel receptacles 1022*a*, 1022*b* that align with and extend L-shaped receptacles 1051, 1053, 1055 when edge members are coupled to extensions 1020, 1022, 1024 of corner member 1001. In some embodiments, edge members 1002, 1003, 1004 each comprises a chamfered edge on an outer surface of each of the parallel receptacles, wherein the chamfered edge tapers inwardly towards the opening of each of the parallel receptacles.

Once framing member 1000 is assembled, a first SEG product 1012 may be coupled to parallel receptacles 1022*a*, 1022*b* of edge members 1002 and 1004 via third receptacle 1055, such that first SEG product 1012 is oriented in a first plane corresponding to a top surface of a cube, a second SEG product (not shown) may be coupled to parallel receptacles 1022*a*, 1022*b* of edge members 1002 and 1003 via first receptacle 1051, such that the second SEG product is oriented in a second plane corresponding to a front surface of a cube (i.e., second plane is perpendicular to the first plane), and a third SEG product (not shown) may be coupled to parallel receptacles 1022*a*, 1022*b* of edge members 1003 and 1004 via second receptacle 1053, such that the third SEG product is oriented in a third plane corresponding to a side surface of a cube (i.e., third plane perpendicular to first and second planes), wherein first 1012, second and third SEG products form a corner of a cube shape. In some embodiments, framing member 1000 further comprises seven additional corner members (not shown) and nine additional edge members (not shown), and two or three additional SEG products (not shown) to provide a complete cube shape, wherein five or six faces of the cube shape comprise a SEG product.

Figure 24:
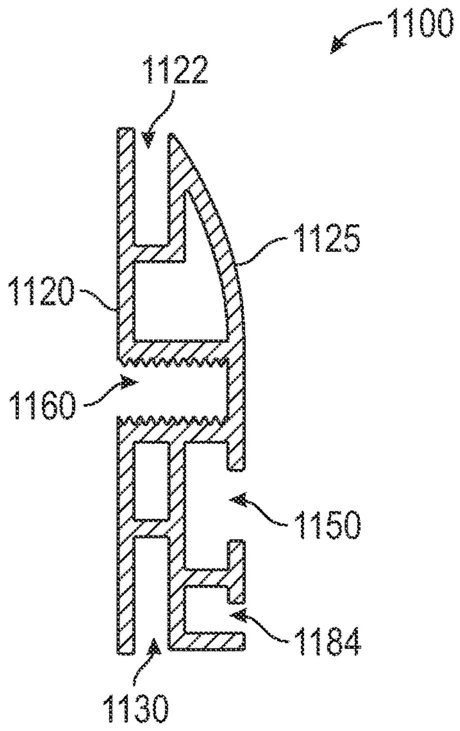
FIG. 24 depicts a cross-section view of a framing member configured for mounting and displaying two SEG products in a back-to-back orientation and comprising a threaded channel for securing the framing member to an existing structure in accordance with a representative embodiment of the present invention.
Figure 25:
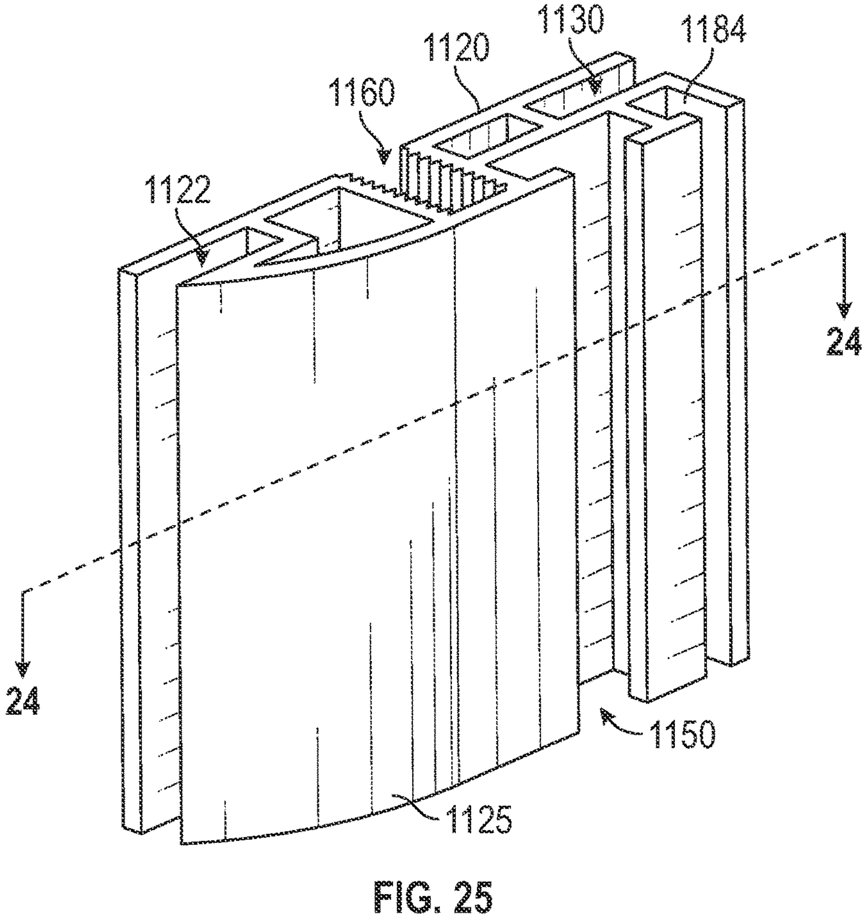
FIG. 25 depicts a perspective view of the framing member of FIG. 24.
Figure 26:
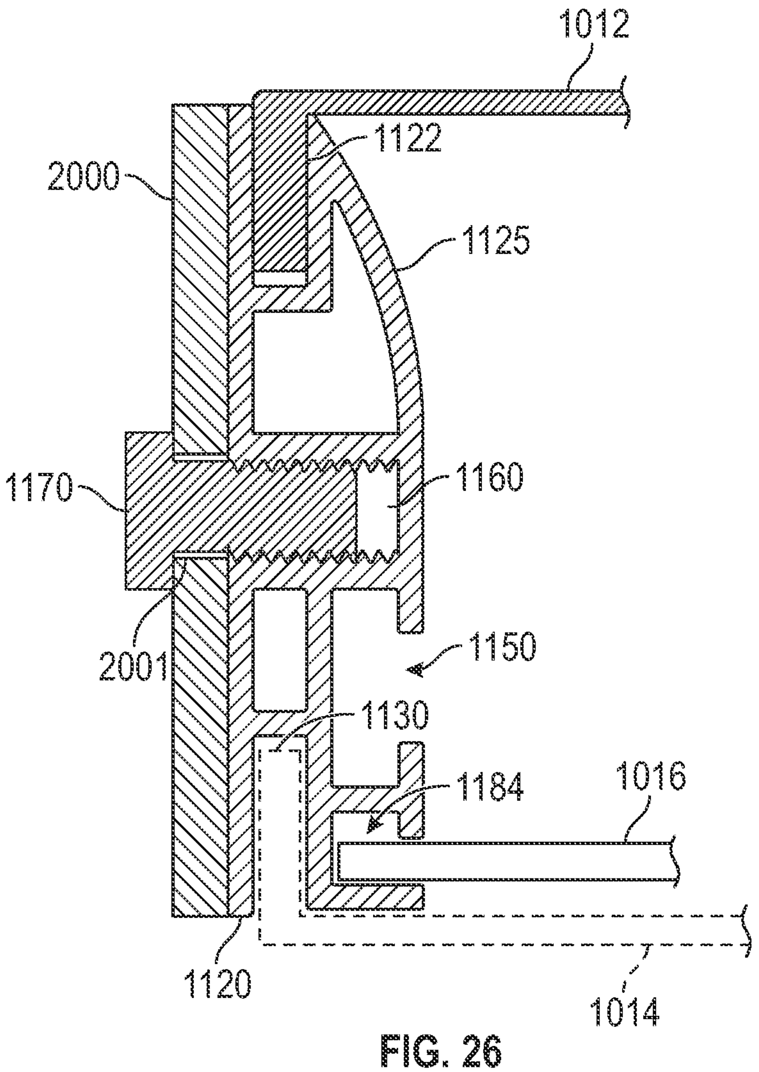
FIG. 26 depicts an installed configuration of the framing member of FIG. 24, in accordance with a representative embodiment of the present invention.

With reference to FIGS. 24-26, a framing member 1100 is configured to receive and display a single SEG product 1012 on a surface or in use with a prefabricated structure, such as a prefabricated frame structure 2000. Framing member 1100 may further be used to display a second SEG product 1014 and/or support a backing board 1016 positioned opposite SEG product 1012.

Framing member 1100 comprises a base 1120 having a channel 1160 comprising female threads for receiving a mechanical fastener 1170 (i.e., a bolt) for securing framing member 1100 to a structure 2000, such as a prefabricated frame structure. In some instances, structure 2000 comprises a plurality of holes 2001, wherein fastener 1170 is secured to channel 1160 by aligning the holes 2001 with channel 1160 at any location along the length of base 1120. In some instances, holes 2001 are predrilled. In other instances, holes 2001 are made by a user during assembly of framing member 1100.

Framing member 1100 further comprises a channel 1150 for selectively receiving a light source and/or mechanical fastener, wherein light emitted from the light source is directed towards SEG product 1012 coupled to forward-facing receptacle 1122. Framing member 1100 comprises a tapered, sloped or chamfered surface 1125 having a reduced height in proximity to channel 1122, wherein surface 1125 is configured to eliminate or reduce shadows on a mounted SEG product 1012 coupled to receptacle 1122 when illuminated by a light source coupled to channel 1150.

In some embodiments, framing member 1100 comprises a rear-facing receptacle 1130 for optionally receiving a second SEG product 1014, wherein second SEG product 1014 is intended to provide a closed, back surface for framing member 1100. Unlike forward-facing receptacle 1122 and first SEG product 1012, rear-facing receptacle 1130 and second SEG product 1014 are not intended to be illuminated by a light source coupled to channel 1150. Rather, receptacle 1130 and second SEG product 1014 provide a solid backing for framing member 1100 and prevent light leakage therethrough. Framing member 1100 further comprises a channel or slot 1184 located adjacent to rear-facing receptacle 1130 and having an inward-facing opening perpendicular to rear-facing receptacle 1130. Channel 1184 is configured to receive an opaque backing board 1016. In some instances, channel 1184 is further configured to house wiring for a light source coupled to channel 1150. In some instances, backing board 1016 is used in combination with second SEG product 1014.

With reference to FIG. 26, framing member 1100 may be secured to an inner surface of a frame structure 2000 via a bolt 1170 and threaded channel 1160, wherein a forward-facing receptacle 1122 receives a first SEG product 1012, and a rear-facing receptacle 1130 receives a second SEG product 1014, wherein SEG product 1014 preferably comprises a light-blocking material. In some instances, a second SEG product 1014 is used in combination with a backing board 1016 inserted within channel or slot 1184, wherein backing board 1016 is configured to block light emitted from a light source coupled to channel 1150. In some instances, a forward-facing surface of backing board 1016 comprises a reflective surface configured to reflect light away from second SEG product 1014 and towards first SEG product 1012.

One of skill in the art will appreciate that the various features and elements of the various embodiments of the present invention may be modified and/or combined within the spirit of the present invention to provide framing members and various configurations of assembled framing member for use in mounting and displaying SEG products. For example, the size, dimensions, shapes, proportions, and materials of the framing members described herein may be modified as desired or necessary based on, for example, the size of a SEG product.

The present invention may be embodied in other specific forms without departing from its structures, methods, or other essential characteristics as broadly described herein and claimed hereinafter. Therefore, the described embodiments are to be considered in all respects only as illustrative, and not restrictive. The scope of the invention is, therefore, indicated by the appended claims, rather than by the foregoing description. All changes that come within the meaning and range of equivalency of the claims are to be embraced within their scope.

What is claimed is:

1. A framing system for displaying a SEG product, the framing system comprising:

a surface configured to receive a light source; and a framing member comprising a receptacle that is configured to receive a silicone bead of the SEG product, the receptacle having a wall comprising a chamfered surface tapered inwardly towards an opening of the receptacle, wherein when the surface has received the light source, the light source has an unobstructed path to the chamfered surface to minimize a shadow of the framing member on the SEG product.

2. The framing system of claim 1, wherein the framing member comprises the surf ace.

3. The framing system of claim 2, wherein the surface comprises the chamfered surface.

4. The framing system of claim 2, wherein the surface further comprises a scribed reference line to assist in aligning and securing the light source to the surface.

5. The framing system of claim 1, wherein the framing system further comprises a second surface configured to receive a second light source, and wherein the framing member further comprises a second receptacle configured to receive a silicone bead of a second SEG product, the second receptacle having a second wall comprising a second chamfered surface tapered inwardly towards an opening of the second receptacle, wherein when the second surface has received the second light source, the second light source has an unobstructed path to the second chamfered surface to minimize a second shadow of the framing member on the second SEG product.

6. The framing system of claim 5, wherein the framing member is configured to display the SEG product and the second SEG product side-by-side in a same viewing plane.

7. The framing system of claim 5, wherein the framing member comprises the surf ace and the second surface.

8. The framing system of claim 7, wherein the second surface is substantially parallel to the surface.

9. The framing system of claim 5, wherein the second receptacle is substantially parallel to the receptacle, and wherein the second receptacle is separated from the receptacle by a divider.

10. The framing system of claim 1, wherein the framing member comprises a channel for receiving a mechanical fastener.

11. The framing system of claim 1, wherein the framing system further comprises a second framing member.

12. The framing system of claim 11, wherein the second framing member comprises the surface.

13. The framing system of claim 11, wherein the framing member comprises a channel configured to secure the framing member to the second framing member via a mechanical fastener.

14. The framing system of claim 11, wherein the framing system is configured to be arranged in substantially the shape of a cube.

15. A framing member configured to receive a silicone bead of a first SEG product and a silicone bead of a second SEG product, the framing member comprising:

a first light mounting surface;

a second light mounting surface, positioned substantially parallel to the first light mounting surface;

a first receptacle for receiving the silicone bead of the first SEG product;

a second receptacle for receiving the silicone bead of the second SEG product, positioned substantially parallel to the first receptacle and to the first and second light mounting surfaces, wherein at least one of the first receptacle and the second receptacle comprises a wall that comprises a chamfered surface tapered inwardly towards an opening of the at least one of the first receptacle and the second receptacle;

a channel configured to secure the framing member to a second framing member via a mechanical fastener; and wherein the framing member is configured to be used in connection with a light source for illuminating at least one of the first SEG product and the second SEG product, and wherein when the framing member is used in connection with the light source, the light source has an unobstructed path to the chamfered surface to minimize a shadow of the framing member on the at least one of the first SEG product and the second SEG product.

16. The framing member of claim 15, wherein at least one of the first light mounting surface and the second light mounting surface is configured to receive the light source.

17. The framing member of claim 15, wherein the second framing member is configured to receive the light source.

* * * * *